March 27, 1928. 1,664,226
A. E. SILVER
BREWING UTENSIL
Filed March 17, 1927
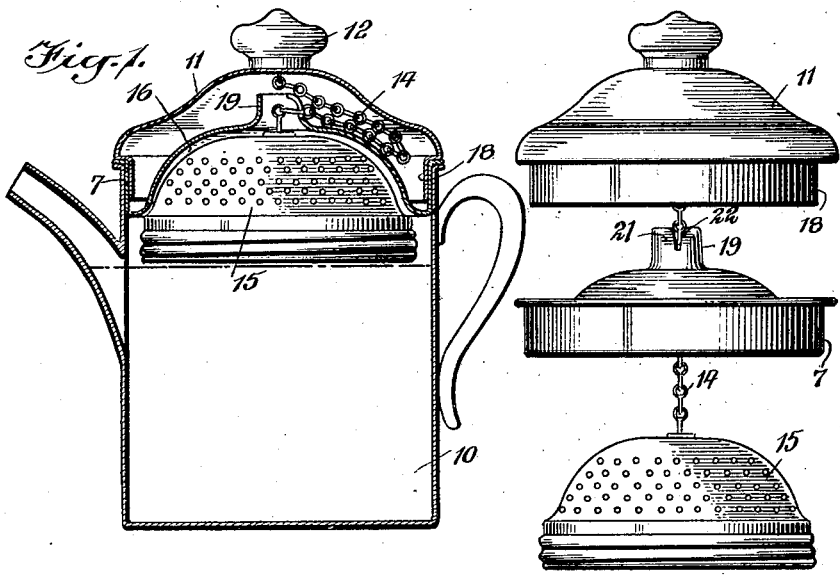
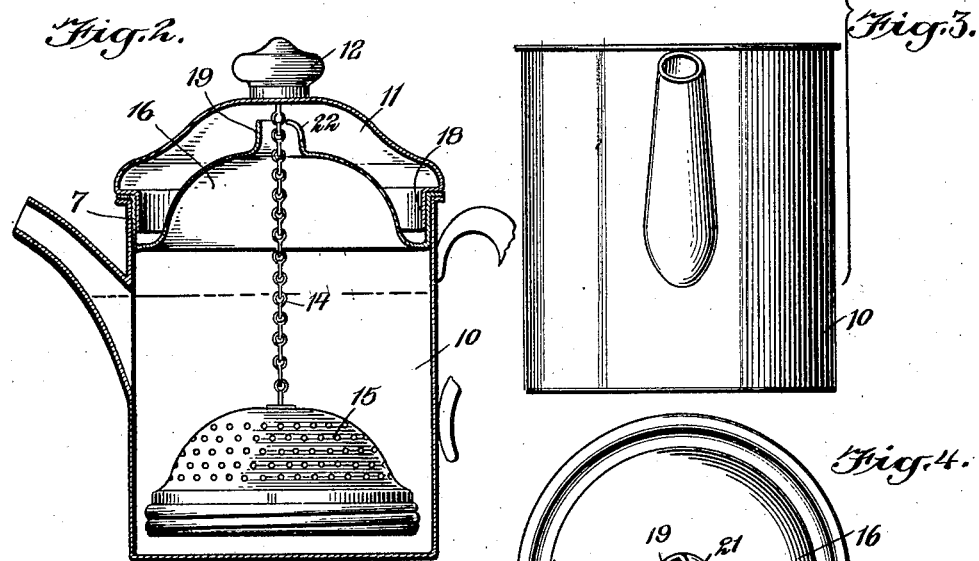
INVENTOR
Arthur E. Silver
BY
ATTORNEY
WITNESSES Patented Mar. 27, 1928.

1,664,226

UNITED STATES PATENT OFFICE.

ARTHUR E. SILVER, OF NEW YORK, N. Y.

BREWING UTENSIL.

Application filed March 17, 1927. Serial No. 176,219.

This invention relates to brewing utensils especially adapted for brewing beverages, such as tea, coffee, or the like, and has particular reference to an improved means constituting a part of the utensil for suspending a receptacle containing the substance to be brewed respectively immersed in the water or other liquid or above the level thereof.

Heretofore similar devices have been used, but the same are open to certain objections, such as, for instance where a chain or other flexible element is drawn upwardly through the cover to elevate the suspended receptacle above water or liquid level, a portion of the chain is disposed exteriorly of the utensil, which in addition to rendering the same unsightly in appearance, in some instances permits the liquid to drain on to the surface upon which the utensil rests, while other devices which are devoid of this objection are so constructed that the knob to which the chain or flexible element is connected, is unattached to the cover so that in pouring the contents from the pot, the knob is displaced and permits escape of the steam.

The present invention aims to overcome the above-recited and other disadvantages by providing an improved tea or coffee pot or other brewing utensil, in which means is carried by the body and independent of the cover for engaging the flexible element attached to the foraminous receptacle, whereby to support said receptacle in elevated position and in which instance the cover and knob are securely attached.

More specifically the invention comprehends a tea or coffee pot in which a foraminous receptacle for the tea leaves or coffee beans, is directly suspended from the cover by a flexible element or connector, together with means carried by the pot body and independent of the cover for engaging the flexible element to support the foraminous receptacle in elevated position.

The invention furthermore contemplates a member carried by the pot body and independent of the cover, having an apertured collar or neck with a curved slotted portion communicating with the apertured portion of the neck to facilitate the engagement of the flexible receptacle-supporting element with said member.

Other objects reside in the simplicity of construction, the economy with which the same may be produced, and the general efficiency derived therefrom.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a vertical sectional view through a coffee or tea pot or other similar brewing utensil equipped with a foraminous receptacle, and illustrating the supporting means adjusted to support and elevate the foraminous receptacle above the level of the liquid in the pot.

Fig. 2 is a similar view illustrating the foraminous receptacle lowered and immersed in the liquid.

Fig. 3 is a side view illustrating the cover and the flexible element-engaging and supporting means removed from the pot body.

Fig. 4 is a plan view of the flexible element-engaging means.

Referring to the drawings by characters of reference, 10 designates a coffee or tea pot, or other utensil body, which is of the usual type open at its upper end and which includes a cover 11 having a knob or handle 12. A chain or other equivalent flexible element 13 is attached to approximately the center of the inner side of the cover 11 and is connected at its lower end to a foraminous receptacle 15 for connecting said receptacle with the cover, the chain or flexible element being of a sufficient length to allow the receptacle 15 to be immersed in the water or other liquid in the body 10. The receptacle 15 is adapted to contain tea leaves, ground coffee beans, or other substance which is to be brewed by its immersion in the liquid in the body 10. After the beverage or brew has reached the desired strength, it is desirable to elevate the receptacle 15 above the level of the liquid, and the present invention comprehends means engageable with the chain or flexible element 14 for this purpose, which means is carried by the body and independent of the cover. The means in the embodiment employed for the purpose of illustration, is in the nature of a supplemental inner cover member 16, which is formed with an annular upstanding flange 17 frictionally fitted within the upper open end of the receptacle, which flange is adapted in turn to frictionally receive the depending flange 18 of the cover 11, it being understood that the frictional fit between the flanges 17 and 18 of a lesser degree than the frictional fit of the flange 17 with the open upper end of the body 10. Due to the greater frictional engagement of the flange 17 with the upper end of the body, it is obvious that when the user grasps the knob 12, the cover 11 will be removed from the member 16 while the member 16 will remain in the body 10 until the receptacle 15 engages the member 16, at which point the chain or flexible element 14 may be employed to unseat the member 16 from the body 10. The member 16 is provided preferably with an upstanding sleeve or neck 19, having an opening 20 through which the chain or flexible element 14 extends, one side 21 of the neck or sleeve 19 is curved upwardly and inwardly and is formed with a substantially V-shaped notch 22, the enlarged open end of which notch communicates with the opening 20 to permit lateral shifting of the chain or flexible element from the opening into the notch.

In use and operation, after the beverage or brew has reached the desired strength, the user temporarily removes the cover 11, drawing upwardly on the chain or flexible element 14 until the foraminous receptacle 15 is disposed at a point above the level of the liquid in the body; the chain or flexible element is then shifted laterally from the opening 20 into the notch 22 until a link or portion of the same is engaged and anchored in the notch, for holding the receptacle elevated. It is thus obvious that when the cover 11 is replaced, the slack of the chain or flexible element will rest upon the upper surface of the member 16 and will be concealed and housed between the member 16 and the cover 11, as illustrated in Fig. 1. This obviously prevents any of the liquid which adheres to the chain from draining exteriorly of the pot, in addition to sealing the pot against the escape of steam or fumes from the beverage. It will be further noted that the chain or flexible element 14 is concealed from view, thereby adding to the attractiveness of the appearance of the pot or utensil. It will be further obvious that the member 16 may be readily removed by lifting the cover to a point where the receptacle 15 engages the member 16 with the chain taut.

What is claimed is:

1. A tea or coffee pot, comprising a body, a cover therefor, a foraminous receptacle, a flexible connection between the cover and foraminous receptacle, and means carried by the body and independent of the cover, with which the flexible connection is engageable to support the foraminous receptacle in an elevated position.

2. A tea or coffee pot, comprising a body, a cover therefor, a foraminous receptacle, a flexible connection between the cover and foraminous receptacle, and means carried by the body and independent of the cover, with which the flexible connection is engageable to support the foraminous receptacle in an elevated position, said means including a shell frictionally fitted within the upper open end of the body and adapted to frictionally receive the cover.

3. A tea or coffee pot, including a body, a cover therefor, a foraminous receptacle, a flexible connection between the cover and foraminous receptacle, and means carried by the body and independent of the cover, with which the flexible connection is engageable to support the foraminous receptacle in an elevated position, said means including a shell frictionally fitted within the upper open end of the body and adapted to frictionally receive the cover, the cover having a lesser frictional contact with the shell than the latter has with the body, whereby removal of the cover may be accomplished without removing the shell.

4. A tea or coffee pot, comprising a body, a cover therefor, a foraminous receptacle, a flexible connection between the cover and foraminous receptacle, and means carried by the body and independent of the cover, with which the flexible connection is engageable to support the foraminous receptacle in an elevated position, said means including an apertured neck having a laterally disposed notched portion communicating with the neck aperture.

5. A tea or coffee pot, including a body, a cover therefor, a foraminous receptacle, a flexible connection between the cover and foraminous receptacle, and means carried by the body and independent of the cover, with which the flexible connection is engageable to support the foraminous receptacle in an elevated position, said means including an apertured neck having an upwardly and inwardly curved portion formed with a notch communicating with the aperture of the neck.

6. A tea or coffee pot, comprising, in combination, a body, a cover therefor, a member carried by the body and independent of the cover, a foraminous receptacle connected with the cover by a flexible connector whereby the receptacle may be raised by the removal of the cover, and means on said member adapted to engage with the connector to hold said receptacle in elevated position.

7. A tea or coffee pot, comprising, in combination, a body, a cover therefor, a foraminous receptacle, a flexible connector between the foraminous receptacle and the cover, whereby the receptacle may be raised upon removal of the cover, and an apertured member supported by the body and independent of the cover, through which the flexible connector extends, the member having a slotted portion communicating with the aperture into which the flexible connector is shiftable and engageable to hold the receptacle in elevated position.

ARTHUR E. SILVER.